United States Patent
Min et al.

(10) Patent No.: US 7,573,935 B2
(45) Date of Patent: Aug. 11, 2009

(54) SYSTEM AND METHOD FOR PERFORMING RANGING IN A CABLE MODEM SYSTEM

(75) Inventors: Jonathan S Min, Buena Park, CA (US); Fang Lu, Rowland Heights, CA (US)

(73) Assignee: Broadcom Corporation, Irvine, CA (US)

(*) Notice: Subject to any disclaimer, the term of this patent is extended or adjusted under 35 U.S.C. 154(b) by 1656 days.

(21) Appl. No.: 10/164,367

(22) Filed: Jun. 10, 2002

(65) Prior Publication Data

US 2002/0191684 A1 Dec. 19, 2002

Related U.S. Application Data

(60) Provisional application No. 60/296,482, filed on Jun. 8, 2001.

(51) Int. Cl.
*H04B 1/38* (2006.01)
(52) U.S. Cl. .................. 375/222; 375/229; 375/231; 375/232
(58) Field of Classification Search .............. 375/222, 375/229, 231, 232; 725/111
See application file for complete search history.

(56) References Cited

U.S. PATENT DOCUMENTS

| | | | |
|---|---|---|---|
| 4,489,416 A | 12/1984 | Stuart | |
| 6,137,793 A | 10/2000 | Gorman et al. | |
| 6,230,326 B1 | 5/2001 | Unger et al. | |
| 6,307,868 B1 | 10/2001 | Rakib et al. | |
| 7,050,419 B2 * | 5/2006 | Azenkot et al. | 370/347 |
| 2002/0036985 A1 * | 3/2002 | Jonas et al. | 370/235 |
| 2002/0073432 A1 * | 6/2002 | Kolze | 725/111 |

* cited by examiner

*Primary Examiner*—David C Payne
*Assistant Examiner*—Leila Malek
(74) *Attorney, Agent, or Firm*—Sterne, Kessler, Goldstein & Fox P.L.L.C.

(57) ABSTRACT

The present invention provides a system and method for performing ranging operations in a cable modem system. In accordance with embodiments of the present invention, transmission times, transmission power levels, transmission carrier frequencies, and pre-equalization parameters are adjusted to provide for robust operation of the cable modem system. More particularly, iterative processing steps are used to provide coefficient ordering, scaling, and aligning between the multiple cable modems and the cable modem termination system present in a cable modem system.

23 Claims, 11 Drawing Sheets

FIG. 6A

| Name | Type (1 byte) | Length (1 byte) | Value (Variable Length) |
|---|---|---|---|
| Timing Adjust | 1 | 4 | TX timing offset adjustment (signed 32-bit, units of (6.25 microsec/64)) |
| Power Level Adjust | 2 | 1 | TX Power offset adjustment (signed 8-bit, 1/4-dB units) |
| Offset Frequency Adjust | 3 | 2 | TX frequency offset adjustment (signed 16-bit, Hz units) |
| Transmit Equalization Adjust | 4 | n | TX equalization data - see details below |
| Ranging Status | 5 | 1 | 1 = continue, 2 = abort, 3 = success |
| Downstream frequency override | 6 | 4 | Center frequency of new downstream channel in Hz |
| Upstream channel ID override | 7 | 1 | Identifier of the new upstream channel. |
| Reserved | 8-255 | n | Reserved for future use |

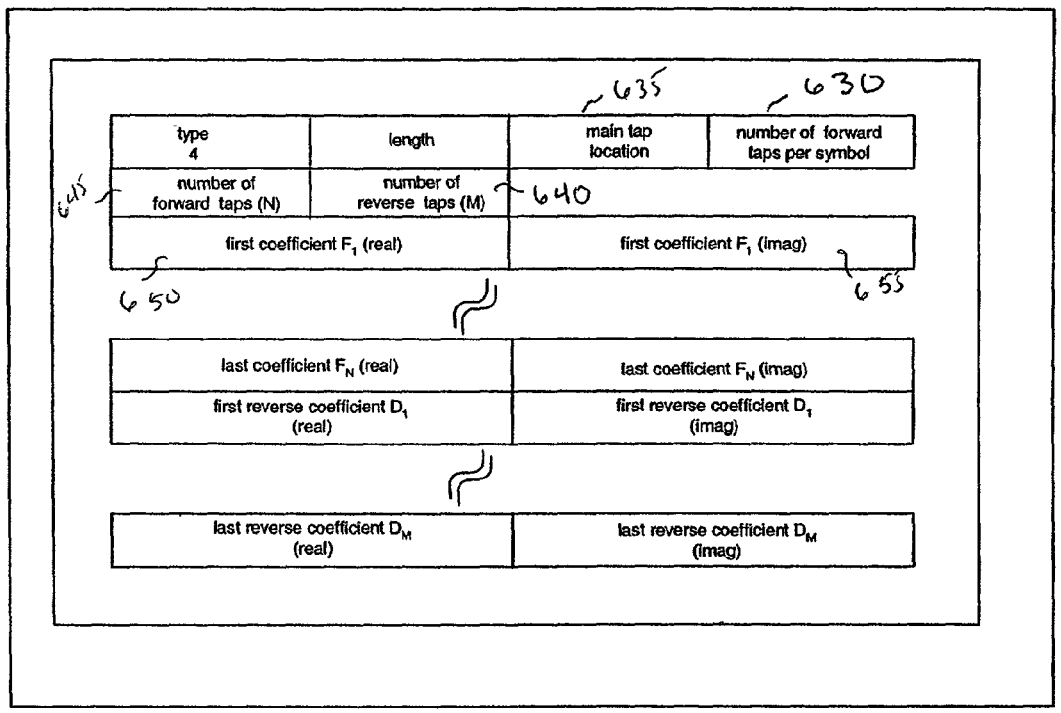

FIG. 6B

SYSTEM AND METHOD FOR PERFORMING RANGING IN A CABLE MODEM SYSTEM

CROSS-REFERENCE TO RELATED APPLICATIONS

This application claims priority to U.S. Provisional Application No. 60/296,482 filed Jun. 8, 2001 and incorporated herein by reference in its entirety.

This application is related to the following U.S. Patent Applications:

U.S. patent application Ser. No. 09/710,238 filed Nov. 9, 2000; and

U.S. patent application Ser. No. 09/780,179 filed Feb. 9, 2001.

BACKGROUND OF THE INVENTION

1. Field of the Invention

The present invention is generally related to communication systems. More particularly, the present invention is related to cable modem systems and methods for ranging cable modems.

2. Related Art

In conventional cable modem systems, a hybrid fiber-coaxial (HFC) network provides a point-to-multipoint topology for supporting data communication between a cable modem termination system (CMTS) at the cable headend and multiple cable modems (CM) at the customer premises. In such systems, information is broadcast downstream from the CMTS to the cable modems as a continuous transmitted signal in accordance with a time division multiplexing (TDM) technique. In contrast, information is transmitted upstream from each of the cable modems to the CMTS as short burst signals in accordance with a time division multiple access (TDMA) technique. The upstream transmission of data from the cable modems is managed by the CMTS, which allots to each cable modem specific slots of time within which to transfer data.

Conventional cable modem systems utilize DOCSIS-compliant equipment and protocols to carry out the transfer of data packets between multiple cable modems and a CMTS. The term DOCSIS (Data Over Cable System Interface Specification) refers to a group of specifications published by CableLabs that define industry standards for cable headend and cable modem equipment. The most recent version of DOCSIS is DOCSIS 2.0. In part, DOCSIS sets forth requirements and objectives for various aspects of cable modem systems including ranging, operations support systems, management, data interfaces, as well as network layer, data link layer, and physical layer transport for data over cable systems.

Ranging is the process used to adjust transmit levels and time offsets of individual cable modems in order to make sure the data coming from the different modems line up in the right time slots and are received at the same power level at the CMTS. Ensuring that data arrives at the same power level is essential for detecting collisions. If two Cable Modems transmit at the same time, but one is weaker than the other one, the CMTS will only hear the strong signal and assume everything is okay. However, if the two signals have the same strength, the signal will garble and the CMTS will know a collision occurred. Carrier frequency adjustments are also made during the ranging process. Adjustments to the carrier frequency are made to ensure that the CM and CMTS are exchanging transmissions at an agreed upon frequency.

Pre-equalization is a process for reducing distortion over the transmission path between the CM and the CMTS and is a part of the above described ranging process. Pre-equalization is achieved using pre-equalization coefficients. The DOCSIS specification provides guidelines for how the pre-equalization coefficients are utilized; however, it does not stipulate as to how the coefficient values are derived.

It has been observed that cable modem systems have not been operated according to their greatest potential. Accordingly, what is desired is a system and method for optimizing the ranging process. In this way robust operation between the multiple cable modems and the cable modem termination system in the HFC network can be achieved.

BRIEF SUMMARY OF THE INVENTION

The present invention provides a system and method for performing ranging operations in a cable modem system. In accordance with embodiments of the present invention, a ranging request burst is transmitted from a cable modem (CM) to a cable modem termination system (CMTS). The ranging request is comprised of a long preamble portion and a payload portion which includes MAC headers. The characteristics of received power, timing, and carrier frequency offsets of the ranging request are estimated by the CMTS from the received ranging request burst waveform. The CMTS also estimates the combined effects of the cable modem's pre-equalizer and the Hybrid-Fiber-Cable channel distortions. This estimation results in the generation of equalizer coefficients. The resulting equalizer coefficients are then sent back to the originating CM so that the CM can update its pre-equalizer coefficients.

In response to transmitting the ranging request, the cable modem receives a ranging response. The ranging response is comprised of a plurality of ranging parameters including an upstream communications parameter, a timing adjust parameter, a power level adjust parameter, a carrier frequency offset parameter, and a plurality of equalization parameters. The equalization parameters include the generated ranging response equalizer coefficients.

Subsequent to receipt of the ranging response at the CM, the current pre-equalizer coefficients for the main tap and non-main taps are set equal to the ranging response equalizer coefficients to generate new pre-equalizer coefficients. In the case where additional ranging responses are received, the ranging response equalizer coefficients are used to convolve the current pre-equalizer coefficients for the main tap and non-main taps according to the algebraic equation EQ1. EQ1 is used to generate new pre-equalizer coefficients. The new pre-equalizer coefficients are then derotated so that an imaginary part of the main tap is equal to zero.

Next, each non-main tap having a determined magnitude squared value below a specified threshold is identified. For each identified non-main tap, the new pre-equalizer coefficient for a real part and an imaginary part is set equal to zero.

Scaled coefficients are then generated using a second algebraic equation, such as for example EQ2A or EQ2B which are also described in greater detail below. EQ2A can be used for absolute sum scaling, while EQ2B can be utilized for Root-Mean-Squared (RMS) scaling. Finally, adjustments to the transmit power of the cable modem are made using an equalizer coefficient gain change value. The equalizer coefficient gain change value is determined from a current equalizer coefficient gain value and a new equalizer coefficient gain value in accordance with equations EQ3 and EQ4.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIGS. 6A and 6B illustrate ranging response encoding in accordance with embodiments of the present invention.

DETAILED DESCRIPTION OF THE INVENTION

Table of Contents

A. Cable Modem System in Accordance with Embodiments of the Present Invention
B. Example Cable Modem System Components in Accordance with Embodiments of the Present Invention
C. Ranging Cable Modems In A Cable Modem System
   1. Example Initialization Method in Accordance with Embodiments of the Present Invention
   2. Example Ranging Request and Example Ranging Response in Accordance with Embodiments of the Present Invention
   3. Timing Adjustment in Accordance with Embodiments of the Present Invention
   4. Power Adjustment in Accordance with Embodiments of the Present Invention
   5. Carrier Frequency Adjustment in Accordance with Embodiments of the Present Invention
   6. Pre-Equalization
      (a) Example Delay Offset Calculation Method in Accordance with Embodiments of the Present Invention
      (b) Example Convolution Method in Accordance with Embodiments of the Present Invention
      (c) Example Coefficient Clipping Method in Accordance with Embodiments of the Present Invention
      (d) Example Coefficient Scaling Method in Accordance with Embodiments of the Present Invention
      (e) Example Power Correction Method in Accordance with Embodiments of the Present Invention
D. Conclusion While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

A. Cable Modem System in accordance with Embodiments of the Present Invention

Figure 1:
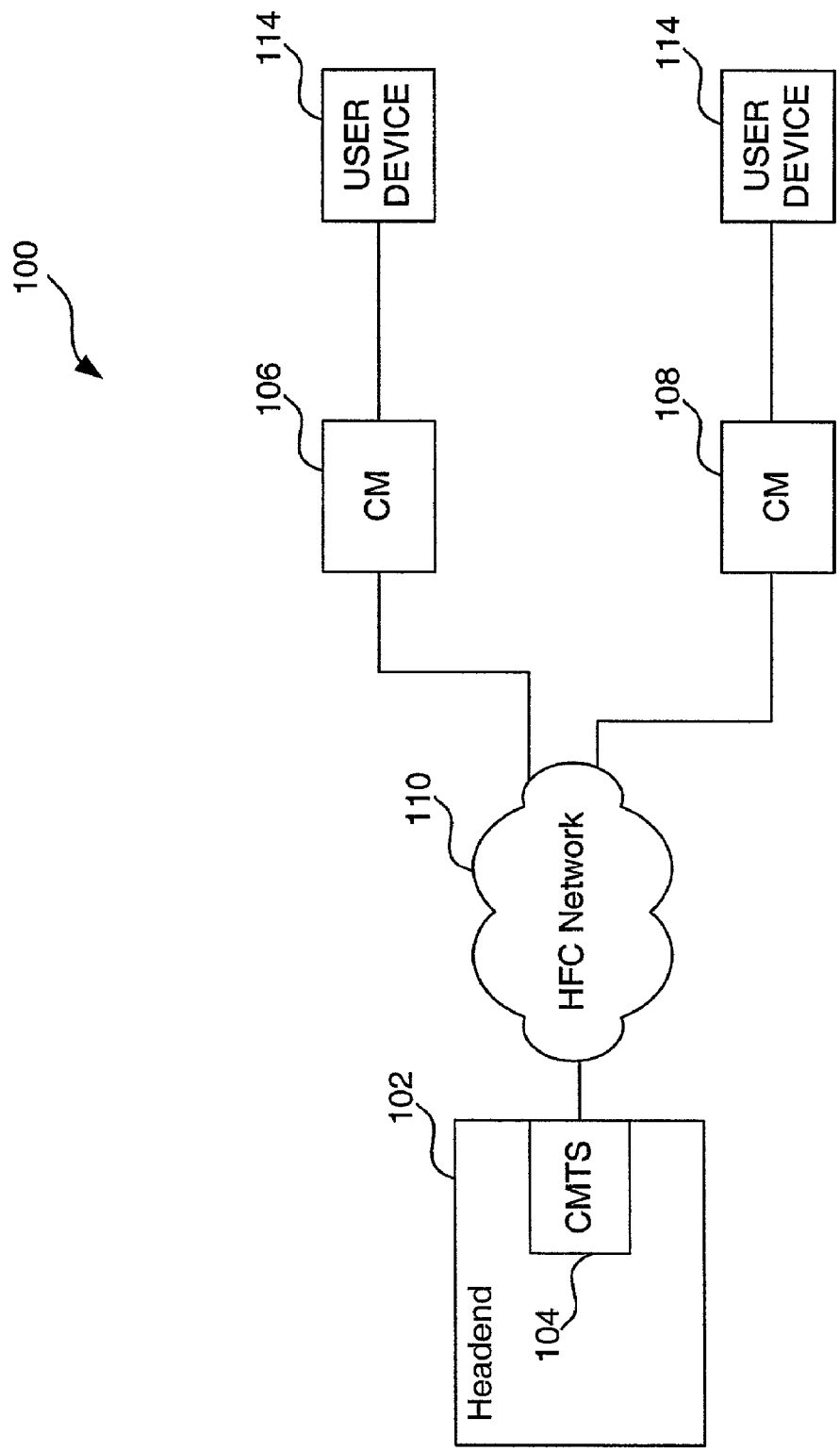
FIG. 1 is a high level block diagram of a cable modem system in accordance with embodiments of the present invention.

FIG. 1 is a high level block diagram of an example cable modem system 100 in accordance with embodiments of the present invention. The cable modem system 100 enables voice communications, video and data services based on a bi-directional transfer of packet-based traffic, such as Internet protocol (IP) traffic, between a cable system headend 102 and a plurality of cable modems over a hybrid fiber-coaxial (HFC) cable network 110. In the example cable modem system 100, only two cable modems 106 and 108 are shown for clarity. In general, any number of cable modems may be included in the cable modem system of the present invention.

The cable headend 102 is comprised of at least one cable modem termination system (CMTS) 104. The CMTS 104 is the portion of the cable headend 102 that manages the upstream and downstream transfer of data between the cable headend 102 and the cable modems 106 and 108, which are located at the customer premises. The CMTS 104 broadcasts information downstream to the cable modems 106 and 108 as a continuous transmitted signal in accordance with a time division multiplexing (TDM) technique. Additionally, the CMTS 104 controls the upstream transmission of data from the cable modems 106 and 108 to itself by assigning to each cable modem 106 and 108 short grants of time within which to transfer data. In accordance with this time division multiple access (TDMA) technique, each cable modem 106 and 108 may only send information upstream as short burst signals during a transmission opportunity allocated to it by the CMTS 104.

The HFC network 110 provides a point-to-multipoint topology for the high-speed, reliable, and secure transport of data between the cable headend 102 and the cable modems 106 and 108 at the customer premises. As will be appreciated by persons skilled in the relevant art(s), the HFC network 110 may comprise coaxial cable, fiberoptic cable, or a combination of coaxial cable and fiberoptic cable linked via one or more fiber nodes.

Each of the cable modems 106 and 108 operates as an interface between the HFC network 110 and at least one attached user device. In particular, the cable modems 106 and 108 perform the functions necessary to convert downstream signals received over the HFC network 110 into IP data packets for receipt by an attached user device. Additionally, the cable modems 106 and 108 perform the functions necessary to convert IP data packets received from the attached user device into upstream burst signals suitable for transfer over the HFC network 110. For clarity, in the example cable modem system 100, each cable modem 106 and 108 is shown supporting only a single user device 114. In general, each cable modem 106 and 108 is capable of supporting a plurality of user devices for communication over the cable modem system 100. User devices may include personal computers, data terminal equipment, telephony devices, broadband media players, network-controlled appliances, or any other device capable of transmitting or receiving data over a packet-switched network.

In the example cable modem system 100, cable modem 106 and 108 represent a conventional DOCSIS-compliant cable modem. In other words, cable modem 106 and 108 transmit data packets to the CMTS 104 in formats that adhere to the protocols set forth in the DOCSIS specification.

Furthermore, in the example cable modem system 100, the CMTS 104 operates to receive and process data packets transmitted to it in accordance with the protocols set forth in the DOCSIS specification. The manner in which the CMTS 104 operates to receive and process data will be described in further detail herein.

Figure 2:
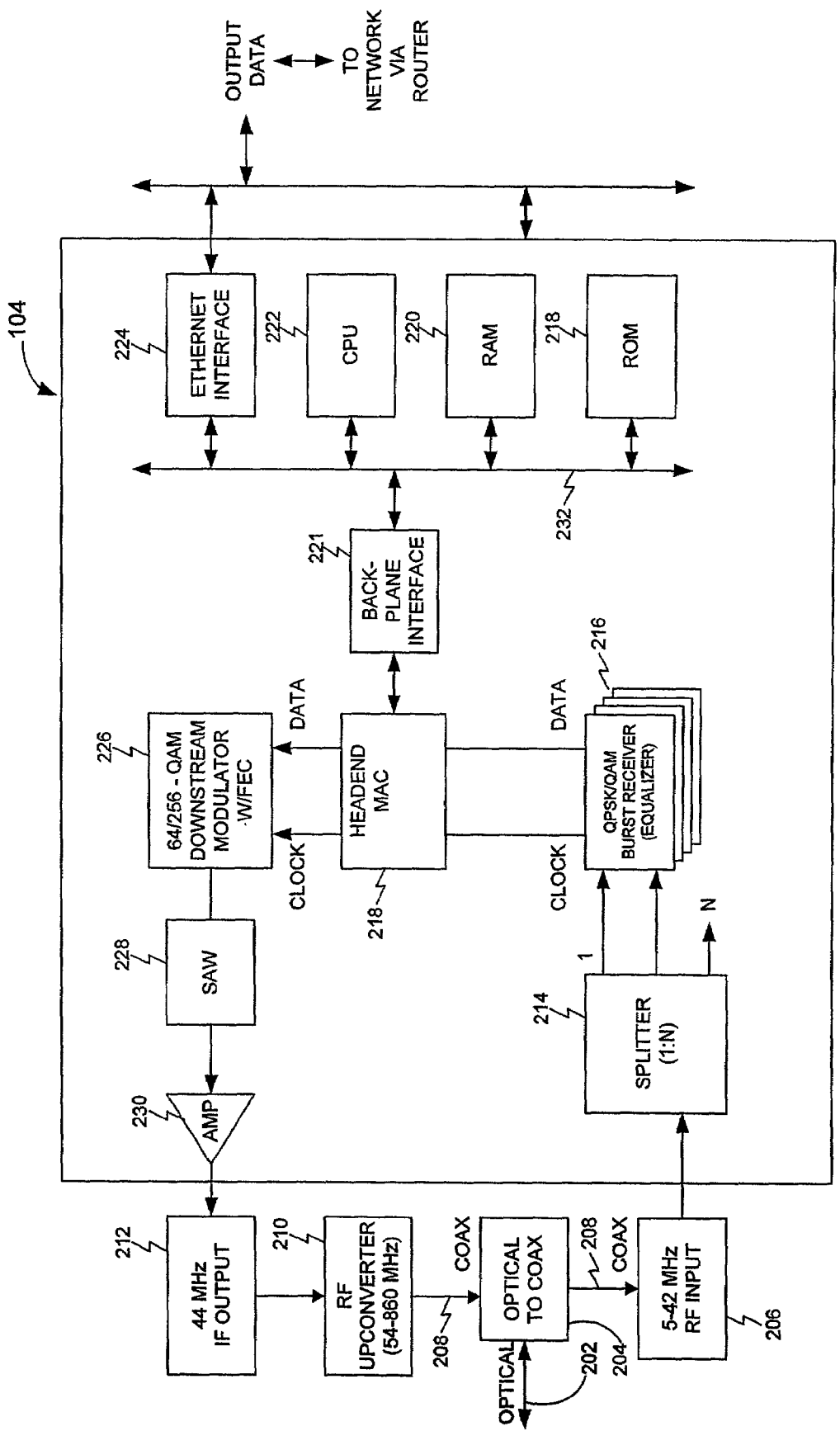
FIG. 2 is a schematic block diagram of a cable modem termination system (CMTS) in accordance with embodiments of the present invention.

B. Example Cable Modem System Components in Accordance with Embodiments of the Present Invention FIG. 2 depicts a schematic block diagram of an implementation of the CMTS 104 of cable modem system 100, which is presented by way of example, and is not intended to limit the present invention. The CMTS 104 is configured to receive and transmit signals to and from the HFC network 110, a portion of which is represented by the optical fiber 202 of FIG. 2. Accordingly, the CMTS 104 will be described in terms of a receiver portion and a transmitter portion.

The receiver portion includes an optical-to-coax stage 204, an RF input 206, a splitter 214, and a plurality of burst receivers 216. Reception begins with the receipt of upstream burst signals originating from one or more cable modems by the optical-to-coax stage 204 via the optical fiber 202. The optical-to-coax stage 204 routes the received burst signals to the radio frequency (RF) input 206 via coaxial cable 208. In embodiments, these upstream burst signals having spectral characteristics within the frequency range of roughly 5-42 MHz.

The received signals are provided by the RF input 206 to the splitter 214 of the CMTS 104, which separates the RF input signals into N separate channels. Each of the N separate channels is then provided to a separate burst receiver 216 which operates to demodulate the received signals on each channel in accordance with either a Quadrature Phase Shift Key (QPSK) or Quadrature Amplitude Modulation (QAM) technique to recover the underlying information signals. The burst receiver 216 contains an equalizer which estimates channel distortions. Each burst receiver 216 also converts the underlying information signals from an analog form to digital form. This digital data is subsequently provided to the headend media access control (MAC) 218.

The headend MAC 218 operates to process the digital data in accordance with the DOCSIS specification. The functions of the headend MAC 218 may be implemented in hardware or in software. In the example implementation of FIG. 2, the functions of the headend MAC 218 are implemented both in hardware and software. Software functions of the headend MAC 218 may be stored in either the random access memory (RAM) 220 or the read-only memory (ROM) 218 and executed by the CPU 222. The headend MAC is in electrical communication with these elements via a backplane interface 221 and a shared communications medium 232. In embodiments, the shared communications medium 232 may comprise a computer bus or a multiple access data network.

The headend MAC 218 is also in electrical communication with the Ethernet interface 224 via both the backplane interface 221 and the shared communications medium 232. When appropriate, Ethernet packets recovered by the headend MAC 218 are transferred to the Ethernet interface 224 for delivery to a packet-switched network via a router.

The transmitter portion of the CMTS 104 includes a downstream modulator 226, a surface acoustic wave (SAW) filter 228, an amplifier 230, an intermediate frequency (IF) output 212, a radio frequency (RF) upconverter 210 and the optical-to-coax stage 204. Transmission begins with the generation of a digital broadcast signal by the headend MAC 218. The digital broadcast signal may include data originally received from the packet-switched network via the Ethernet interface 224. The headend MAC 218 outputs the digital broadcast signal to the downstream modulator 226 which converts it into an analog form and modulates it onto a carrier signal in accordance with either a 64-QAM or 256-QAM technique.

The modulated carrier signal output by the downstream modulator 256 is input to the SAW filter 228 which passes only spectral components of the signal that are within a desired bandwidth. The filtered signal is then output to an amplifier 230 which amplifies it and outputs it to the IF output 212. The IF output 212 routes the signal to the RF upconverter 210, which upconverts the signal. In embodiments, the upconverted signal has spectral characteristics in the frequency range of approximately 54-860 MHz. The upconverted signal is then output to the optical-to-coax stage 204 over the coaxial cable 208. The optical-to-coax stage 204 broadcasts the signal via the optical fiber 202 of the HFC network 110.

Figure 3:
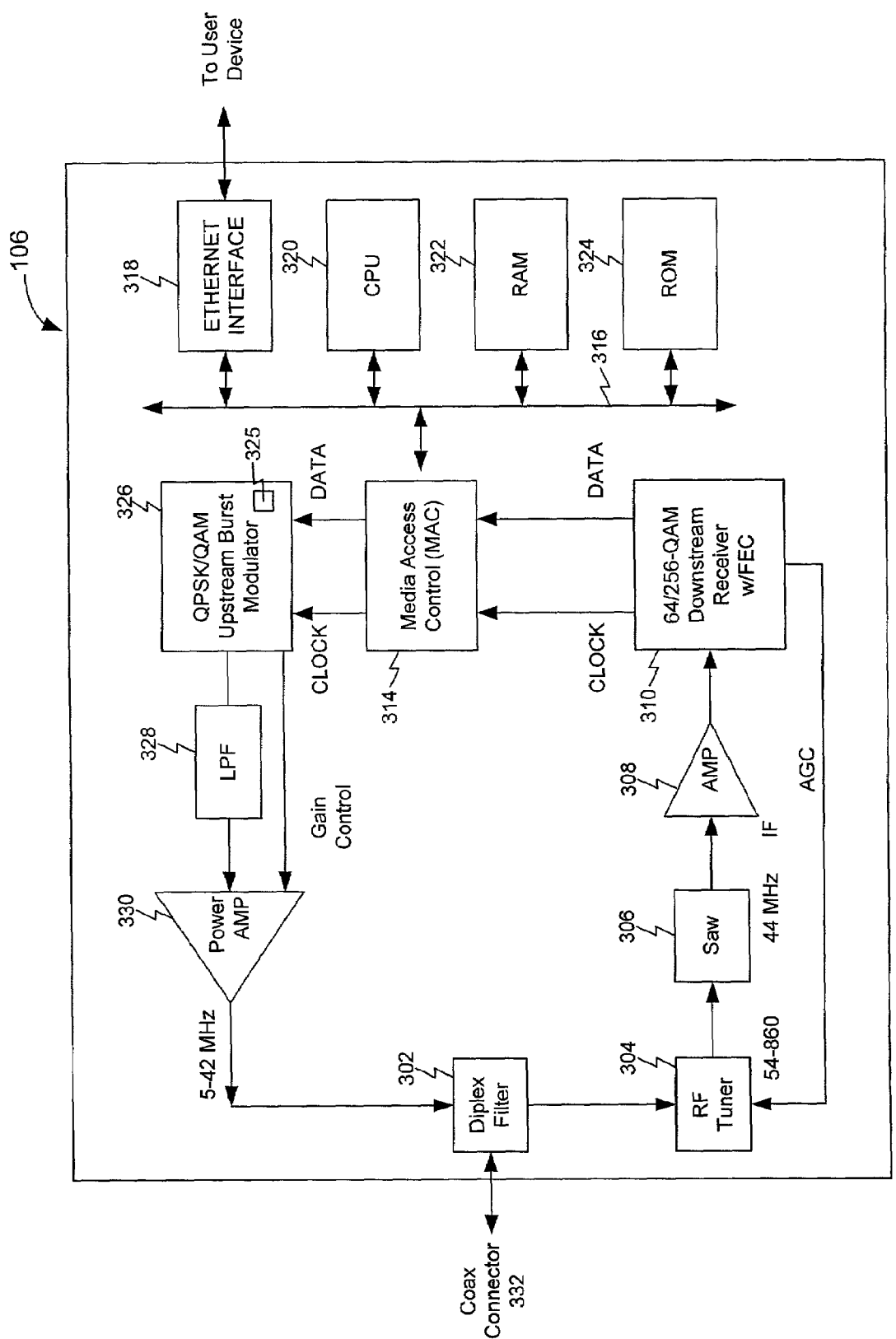
FIG. 3 is a schematic block diagram of a cable modem in accordance with embodiments of the present invention.

FIG. 3 depicts a schematic block diagram of an implementation of the cable modem 106 of cable modem system 100, which is presented by way of example, and is not intended to limit the present invention. The cable modem 106 is configured to receive and transmit signals to and from the HFC network 110 via the coaxial connector 332 of FIG. 3. Accordingly, the cable modem 106 will be described in terms of a receiver portion and a transmitter portion.

The receiver portion includes a diplex filter 302, an RF tuner 304, a SAW filter 306, and amplifier 308, and a downstream receiver 310. Reception begins with the receipt of a downstream signal originating from the CMTS 104 by the diplex filter 302. The diplex filter 302 operates to isolate the downstream signal and route it to the RF tuner 304. In embodiments, the downstream signal has spectral characteristics in the frequency range of roughly 54-860 MHz. The RF tuner 304 downconverts the signal and outputs it to the SAW filter 306, which passes only spectral components of the downconverted signal that are within a desired bandwidth. The filtered signal is output to the amplifier 308 which amplifies it and passes it to the downstream receiver 310. Automatic gain controls are provided from the downstream receiver 310 to the RF tuner 304.

The downstream receiver 310 demodulates the amplified signal in accordance with either a 64-QAM or 256-QAM technique to recover the underlying information signal. The downstream receiver 310 also converts the underlying information signal from an analog form to digital form. This digital data is subsequently provided to the media access control (MAC) 314.

The MAC 314 processes the digital data, which may include, for example, Ethernet packets for transfer to an attached user device. The functions of the MAC 314 may be implemented in hardware or in software. In the example implementation of FIG. 3, the functions of the MAC 314 are implemented in both hardware and software. Software functions of the MAC 314 may be stored in either the RAM 322 or the ROM 324 and executed by the CPU 320. The MAC 314 is in electrical communication with these elements via a shared communications medium 316. In embodiments, the shared communications medium may comprise a computer bus or a multiple access data network.

The MAC 314 is also in electrical communication with the Ethernet interface 318 via the shared communications medium 316. When appropriate, Ethernet packets recovered by the MAC 314 are transferred to the Ethernet interface 318 for transfer to an attached user device.

The transmitter portion of the cable modem 108 includes an upstream burst modulator 326, a digital to analog converter 327, a low pass filter 328, a power amplifier 330, and the diplex filter 302. Transmission begins with the construction of a data packet by the MAC 314. The data packet may include data originally received from an attached user device via the Ethernet interface 318. In accordance with embodiments of the present invention, the MAC 314 may format the data packet in compliance with the protocols set forth in the DOCSIS specification. The MAC 314 outputs the data packet to the upstream burst modulator 326 which converts it into analog form and modulates it onto a carrier signal in accordance with either a QPSK or QAM technique.

The upstream burst modulator 326 also performs pre-equalization of the modulated carrier signal using a pre-equalizer 325. The pre-equalizer 325 is provided with a number of filter "taps" through which the modulated carrier signal is passed. One tap is designated the main tap. The remaining taps are referred to as non-main taps. Each tap has both a real part and an imaginary part. Each real part and each imaginary part are assigned equalizer coefficients that are used to cancel inter-symbol interference within the modulated carrier signal. The modulated carrier signal is passed from the pre-equalizer 325 to the low pass filter 328 which passes signals with spectral characteristics in a desired bandwidth. In embodiments, the desired bandwidth is within the frequency range of approximately 5-42 MHz. The filtered signals are then introduced to the power amplifier 330 which amplifies the signal and provides it to the diplex filter 302. The gain in the power amplifier 330 is regulated by the burst modulator 326. The diplex filter 302 isolates the amplified signal and transmits it upstream over the HFC network 110 during a scheduled burst opportunity.

C. Ranging Cable Modems in a Cable Modem System

When a new cable modem is added to the network and periodically thereafter, a ranging process is performed to determine the network delay between the cable modem and the cable modem termination system. This ranging process is also used to establish and maintain the power transmission level, carrier frequency, and transmission times used by the cable modem.

Figure 4A:
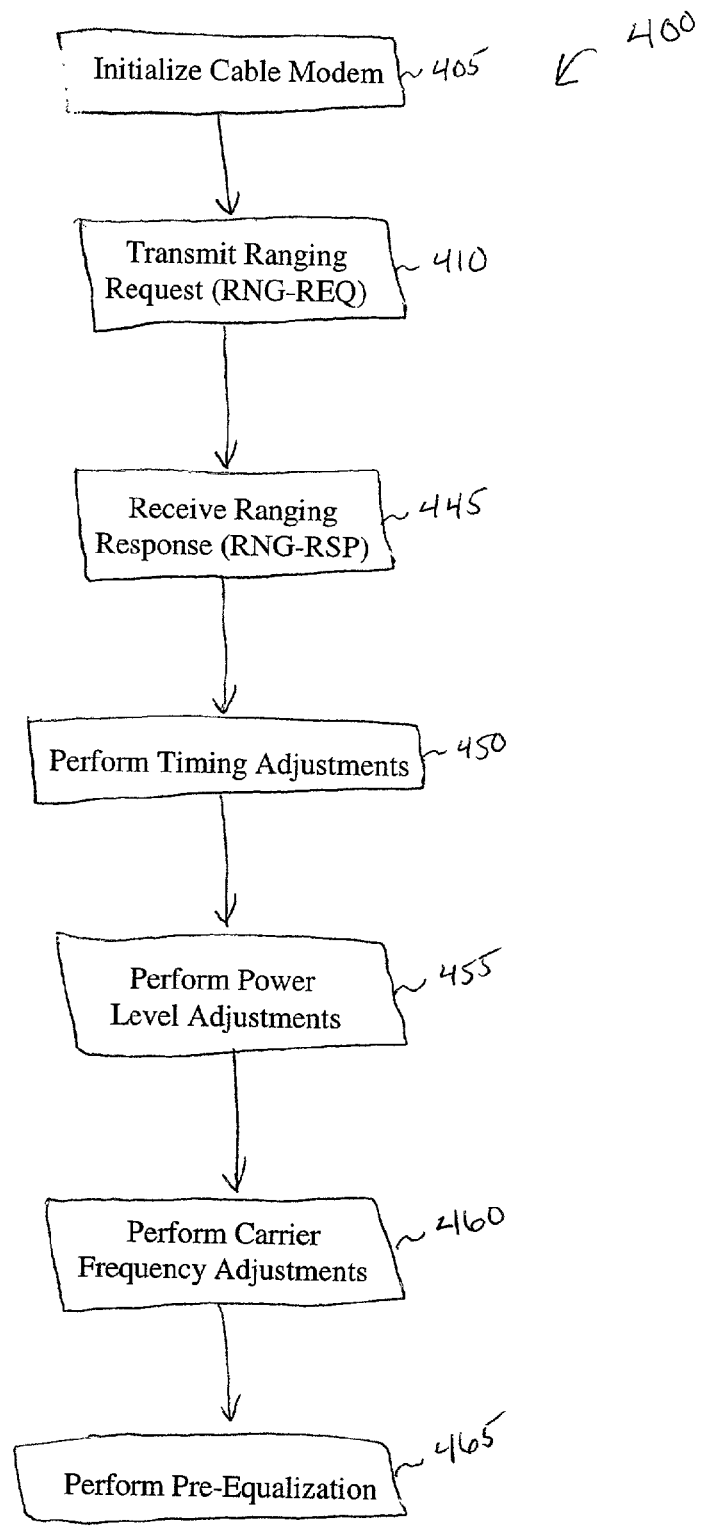
FIGS. 4A and 4B are flowcharts of a method for performing ranging in a cable modem system according to embodiments of the present invention.

FIG. 4A depicts a flowchart 400 of a method for performing ranging operations in a cable modem system comprised of multiple cable modems and a cable modem termination system in accordance with embodiments of the present invention. The invention, however, is not limited to the description provided by the flowchart 400. Rather, it will be apparent to persons skilled in the relevant art(s) from the teachings provided herein that other functional flows are within the scope and spirit of the present invention. The flowchart 400 will be described with continued reference to the example CMTS 104 and cable modem 106 of the cable modem system 100, as well as in reference to the example hardware implementation of the cable modem 106 of FIG. 3.

Prior to making an initial ranging request, a cable modem that is newly added to the cable modem system 100 must first be initialized (step 405).

Figure 5:
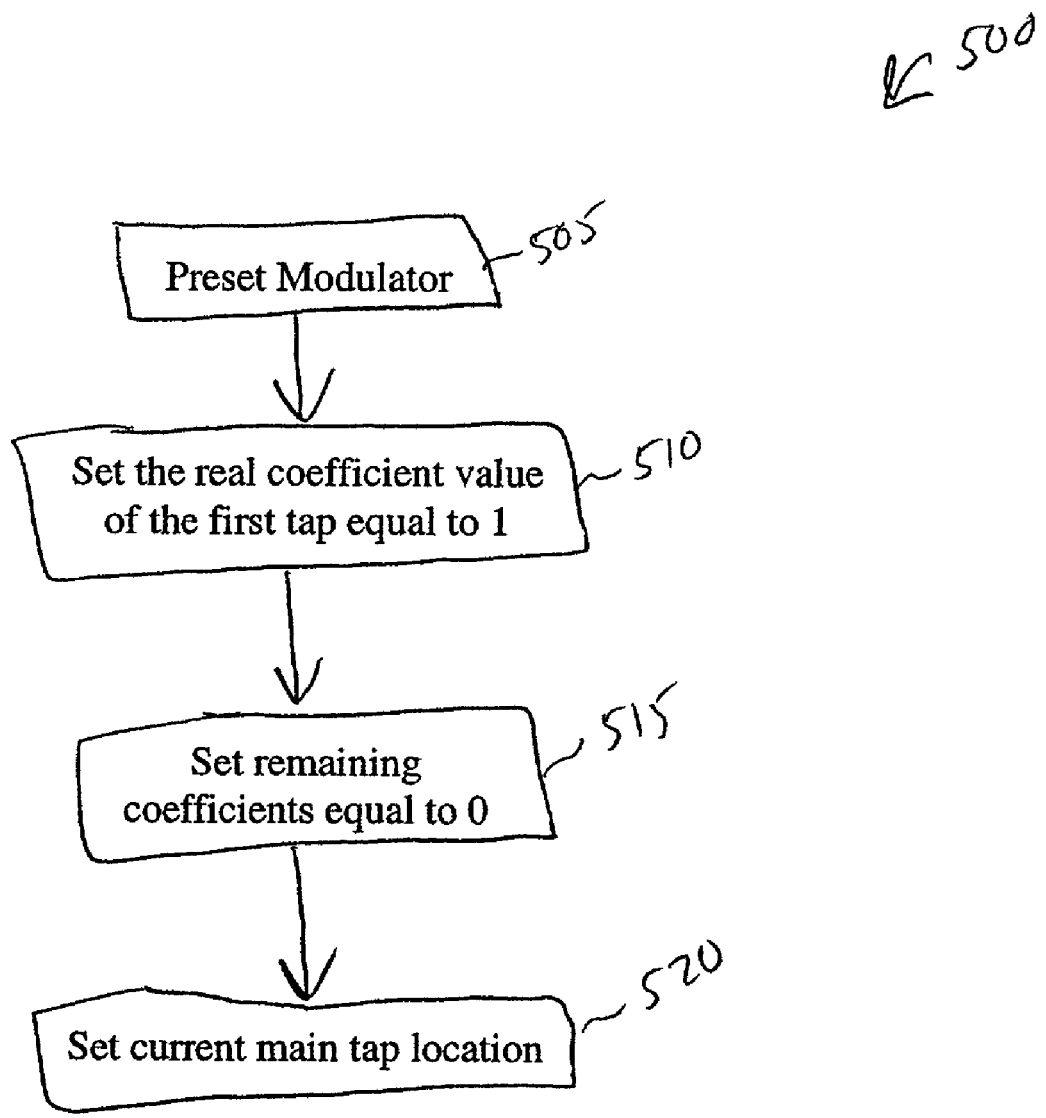
FIG. 5 is a flowchart of a method for initializing a cable modem according to embodiments of the present invention.

1. Example Initialization Method in Accordance with Embodiments of the Present Invention FIG. 5 illustrates an initialization routine 500 for initializing the CM 106 according to an embodiment of the present invention.

In step 505, the modulator of the CM 106 is preset according to default settings determined during manufacture.

The pre-equalizer 325 has a number of taps designated herein as $F_1$ to $F_N$. One tap is designated as the main tap and the others are referred to as non-main taps. Each tap has both a real part and an imaginary part to which a pre-equalizer coefficient is assigned for performing filtering of the carrier signal.

The CM must initialize the pre-equalizer coefficients to a default setting prior to making an initial ranging request. Therefore, in step 510, the coefficient value of the real part of the first tap ($F_{1real}$) is set equal to one (1).

Following step 510, in a next step 515, the remaining pre-equalizer coefficients ($F_{1imaginary}$) to ($F_N$) are set equal to zero (0).

Finally, in a step 520, the first tap ($F_1$) is stored as the current main tap location. As would be understood by a person of ordinary skill in the art, the main tap location refers to the position of the zero delay tap between 1 and N.

2. Example Ranging Request and Example Ranging Response in Accordance with Embodiments of the Present Invention Referring again to FIG. 4A, following the initialization step 405, in step 410, a ranging request (RNG-REQ) is transmitted by the CM 106 to the CMTS 104. The RNG-REQ is comprised of a long preamble portion and a payload portion which includes MAC headers, transmitted at default settings for the power transmission level, carrier frequency, and pre-equalizer coefficients. The default settings for the pre-equalizer coefficients for the main tap and non-main taps are set during the initialization routine 500. Upon receiving the RNG-REQ, the CMTS 104 generates a ranging response (RNG-RSP).

FIG. 6A provides an illustration of the RNG-RSP message encoding according to the DOCSIS specification. The RNG-RSP includes parameters addressing, among other things, upstream communications channels, timing, power, frequency, and equalization. The upstream communications parameter 605 is used to indicate the upstream channel on which the CM 106 must transmit.

The timing adjust parameter 610 is used to indicate the time amount by which the CM 106 must advance or delay its transmissions so that subsequent bursts will arrive at the CMTS 104 at the appropriate times. The power level adjust parameter 615 is used to indicate the change in transmission power level that is required in order for transmissions from the CM 106 to arrive at the CMTS 104 at the proper power level. The carrier frequency offset parameter 620 is used to indicate any changes in the transmission frequency that are needed to ensure that the CM 106 and CMTS 104 are properly aligned. The equalization parameters 625 provide the equalization coefficients used by the CM 106 to perform pre-equalization.

Referring to FIG. 6B, as required by the DOCSIS specification, the number of forward taps per symbol 630 must be either 1, 2, or 4. The main tap location 635 refers to the position of the zero delay tap, between 1 and N. For a symbolspaced equalizer, the number of forward taps per symbol field 630 must be set to one (1). The number of reverse taps 640 (M) must be set to zero (0) for a linear equalizer. The total number of taps 645 may range up to sixty-four (64). As stated above, each tap ($F_1$-$F_N$) consists of a real coefficient 650 and an imaginary coefficient 655 entry in the table.

Figure 4B:
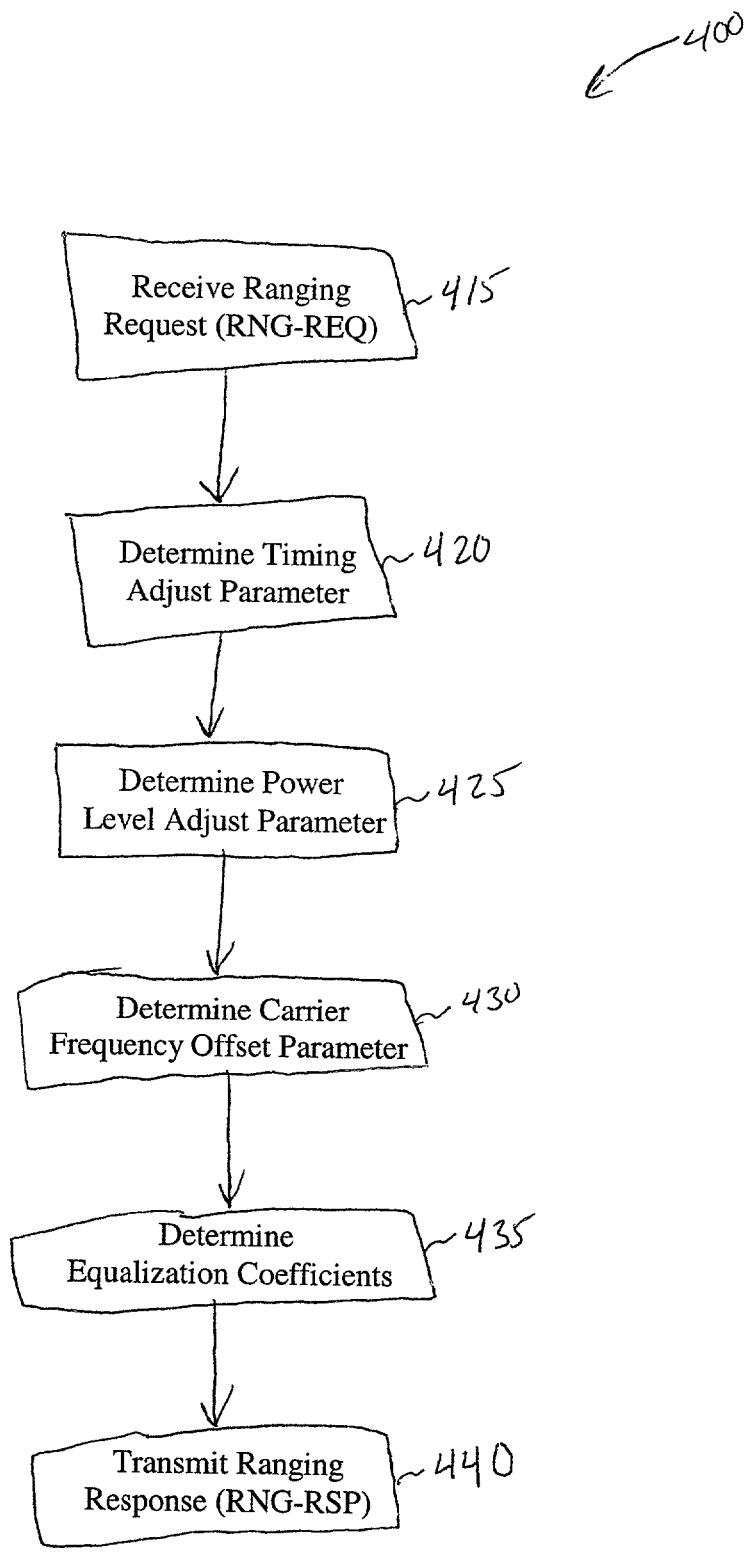

An exemplary method for generating the RNG-RSP in accordance with embodiments of the present invention will now be described with reference to FIG. 4B.

In a step 415, CMTS 104 receives the RNG-REQ from the CM 106. In response, a timing adjust parameter is determined (step 420). Following step, 420, in a step 425, a power level adjust parameter is determined. Once the power level adjust parameter has been determined, in a step 430, a carrier frequency offset parameter is determined. Upon the completion of step 430, in a step 435, equalization coefficients are determined.

In an embodiment of the present invention, the ranging response is set according to the DOCSIS 1.1 specification requirements. Accordingly, the following parameters and values are used: the main tap location (K) is set equal to four (4); the number of forward taps per symbol is set equal to one (1); the number of forward taps (N) is set equal to eight (8); and the number of reverse taps (M) is set equal to zero (0). Further, the equalizer coefficients for the taps ($F_1$-$F_N$) are determined by the equalizer of the burst receiver 216 by estimating the overall channel response. In an alternative embodiment, where there is spectrum inversion in the up/down conversion path, the imaginary parts of the equalizer coefficients are negated.

Once the RNG-RSP is generated, it is transmitted to the CM 106 (step 440).

Returning to FIG. 4A, the RNG-RSP is subsequently received by the CM 106 (step 445).

3. Timing Adjustment in Accordance with Embodiments of the Present Invention

The CMTS 104 requires that transmissions from each cable modem in the cable modem system 100 be received at a specified time. In a step 450, initial and periodic timing adjustments are made to maintain the timing sequence between the CM 106 and the CMTS 104. The ranging response sent to the cable modem 106 includes a timing adjust parameter. The transmission time parameter in the cable modem 106 is adjusted by an amount equal to the timing adjust parameter. By transmitting in accordance with the adjusted transmission time parameter, the cable modem 106 can expect that its subsequent transmissions will arrive at the CMTS 104 at the appropriate times.

4. Power Level Adjustment in Accordance with Embodiments of the Present Invention The CMTS 104 also requires that transmissions from each cable modem in the cable modem system 100 be received at a specified power level. In a step 455, initial and periodic power level adjustments are made to maintain the appropriate power level at the CM 106. The ranging response sent to the cable modem 106 includes a power level adjust parameter. The power transmission level parameter in the cable modem 106 is adjusted by an amount equal to the power level adjust parameter. By transmitting in accordance with the adjusted power transmission level parameter, the cable modem 106 can expect that its transmissions will arrive at the CMTS 104 at the appropriate power level.

5. Carrier Frequency Adjustment in Accordance with Embodiments of the Present Invention The CMTS 104 also requires that transmissions from each cable modem in the cable modem system 100 be received at a specified upstream carrier frequency. In a step 460, initial and periodic carrier frequency adjustments are made to maintain the appropriate carrier frequency settings. The ranging response sent to the cable modem 106 includes a carrier frequency offset parameter. The upstream carrier frequency parameter in the cable modem 106 is adjusted by an amount equal to the carrier frequency offset parameter. In an embodiment of the present invention, the carrier frequency offset parameter can be averaged over multiple periodic ranging iterations in either the CM 106 or the CMTS 104 in order to improve the accuracy of the carrier frequency offset parameter.

6. Pre-Equalization

Figure 7:
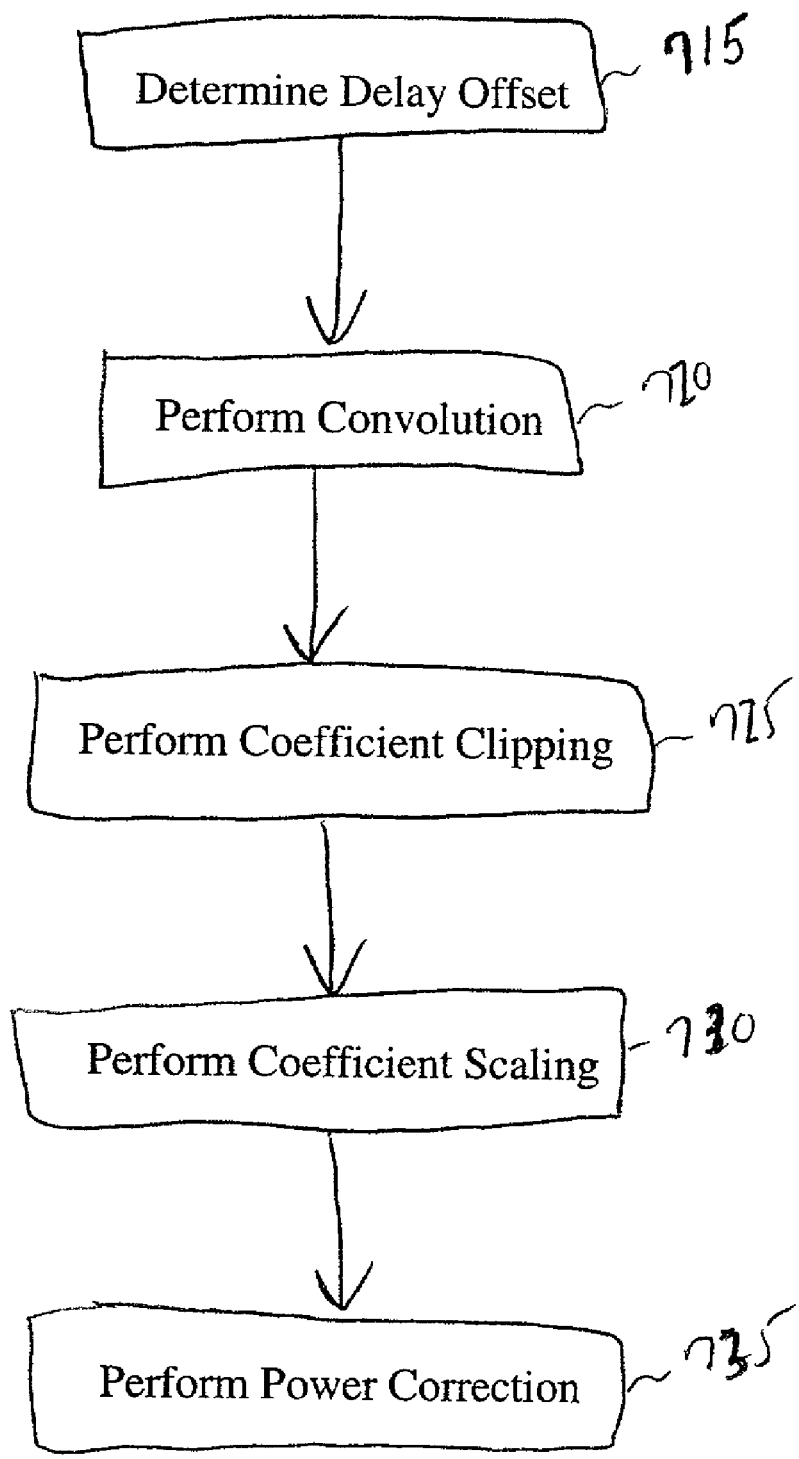
FIG. 7 is a flowchart of a method for performing pre-equalization during ranging of a cable modem according to embodiments of the present invention.

In a step, 465, pre-equalization is performed. Pre-Equalization is used to reduce noise and improve the overall quality of transmissions exchanged between the cable modem 106 and the CMTS 104. FIG. 7 provides an exemplary pre-equalization routine in accordance with embodiments of the present invention.

(a) Example Delay Offset Calculation Method in Accordance with Embodiments of the Present Invention In step 715, the CM 106 determines a delay offset. The delay offset represents the time by which frame transmission should be offset so that frames transmitted by the CM 106 arrive at the CMTS 104 at the appropriate time.

Figure 8:
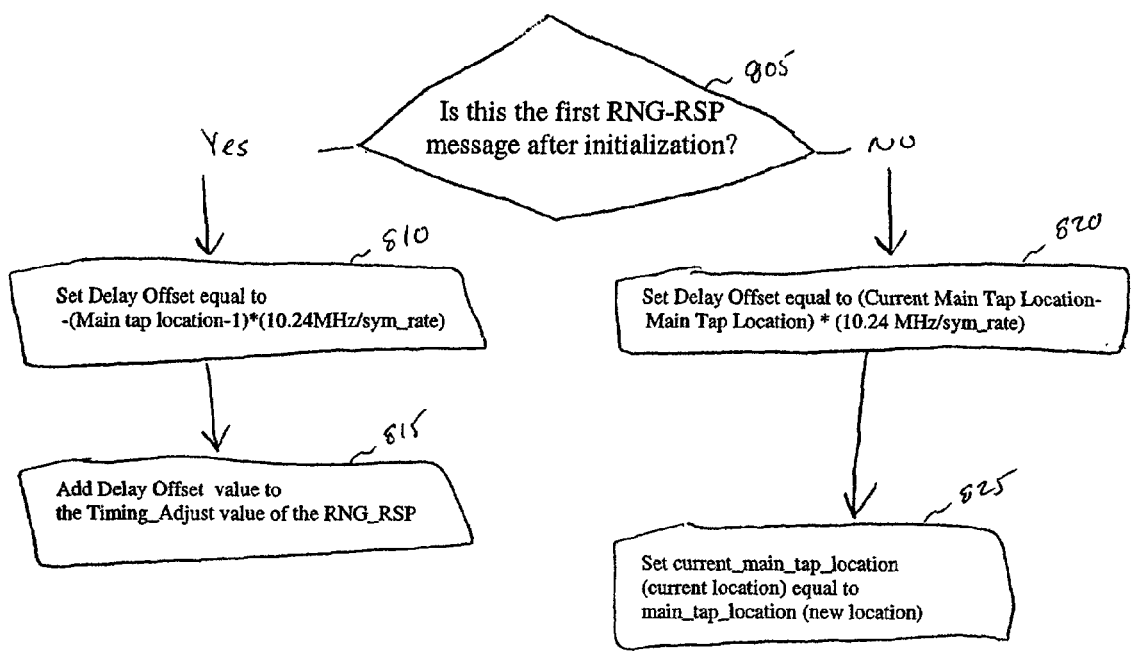
FIG. 8 is a flowchart of a method for calculating delay offsets during ranging of a cable modem according to embodiments of the present invention.

Referring to FIG. 8, if this is the first RNG-RSP received by the CM 106 after initialization (step 805), then in a step 810, the delay offset is calculated as —(Main tap location−1)* (10.24 MHz/sym_rate).

In a step 815, the delay offset value determined in step 810 is added to the timing adjust parameter provided in the RNG-RSP message.

When a subsequent RNG-RSP message is received, in a step 820, the delay offset is calculated as the (current main tap location-the main tap location specified in the ranging response)*(10.24 MHz/Sym_rate).

In a step 825, the current main tap location is set equal to the main tap location specified in the subsequent RNG-RSP message.

Figure 9:
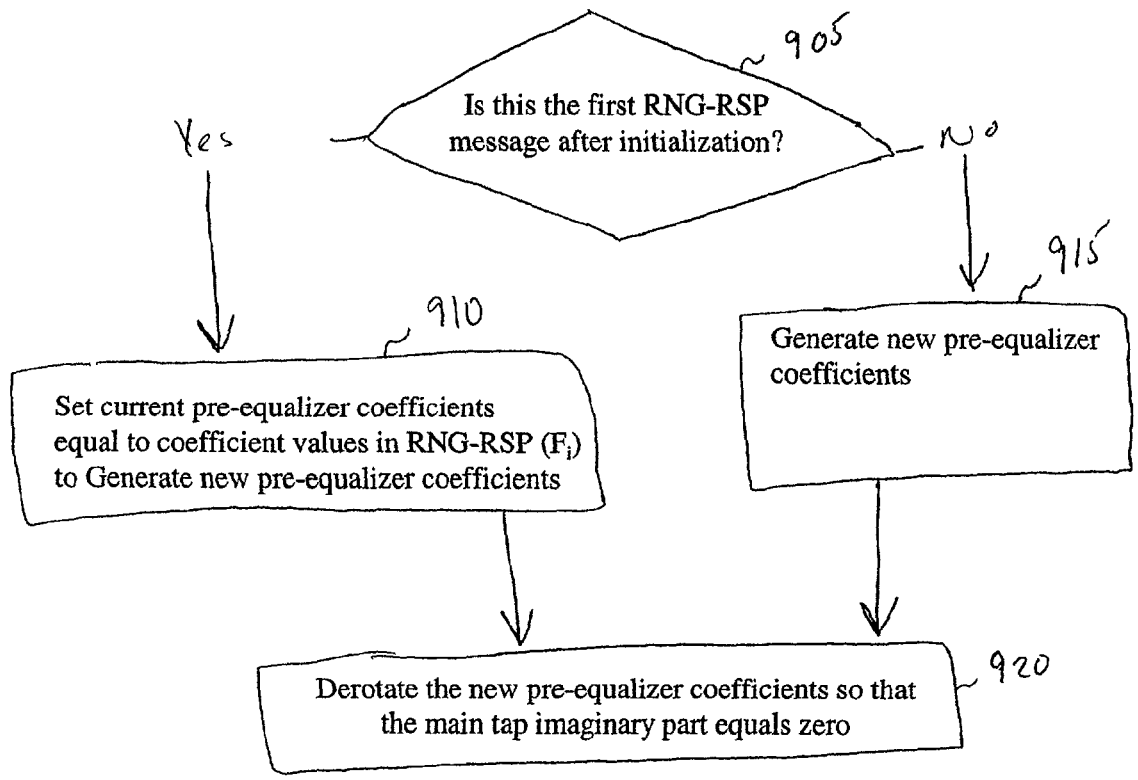
FIG. 9 is a flowchart of a method for performing convolution during ranging of a cable modem according to embodiments of the present invention.

(b) Example Convolution Method in Accordance with Embodiments of the Present Invention Once the delay offset has been determined, convolution is performed (FIG. 7, step 720). An exemplary convolution routine in accordance with an embodiment of the present invention will be described with reference to FIG. 9.

In a step 905, a determination is made as to whether the RNG-RSP message is the first ranging response received since the CM 106 was initialized.

In response to receiving the first RNG-RSP the current pre-equalizer coefficients are set equal to the ranging response equalizer coefficients transmitted in the RNG-RSP (step 910).

As subsequent RNG-RSP messages are received, the CM 106 must convolve the current pre-equalizer coefficients set during initialization or previous ranging iterations with the ranging request equalizer coefficients received in the RNG-RSP message. Accordingly, in a step 915, the current pre-equalizer coefficients are convolved in an embodiment of the present invention using the equation:

$$C'_j = \sum_{i=1}^{N} F_i C_{j-i+K} \tag{EQ1}$$

where Cj and Cj' are the respective current and new pre-equalizer coefficients. K is the main tap location, N is the number of feedforward taps (for example, N=8), and F(i) are the ranging request equalizer coefficients in the RNG-RSP message sent by the CMTS 104 and i and j are integers. In the present example where N=8, the value of $C_i$ outside the range (i=1–8) of the equalizer tap span should be set to zero (0). It therefore follows that the coefficients $C_{-6}$ to $C_0$ and $C_9$ to $C_{15}$ would be set equal to zero (0).

Phase noise in the vector summation occurring during the convolution process produces phase rotation. Therefore, after each convolution (step 910 or 915), the main tap must be derotated so that the imaginary part of the main tap=0. In this way the gain loss is minimized. Thus, in a step 920, where the value of the imaginary part of the main tap is small, the imaginary value is simply reset to zero (0). Alternatively, where the imaginary part value is not small, the main tap angle must be calculated and derotated according to steps that would be apparent to a person of ordinary skill in the art after reading the disclosure provided herein.

(c) Example Coefficient Clipping Method in Accordance with Embodiments of the Present Invention Referring again to FIG. 7, once convolution has been completed, in a step 725, coefficient clipping is performed. Coefficient clipping is used to reduce the self noise effect resulting from the convolution process. An exemplary routine for performing coefficient clipping in accordance with an embodiment of the present invention will now be described with reference to FIG. 10.

Figure 10:
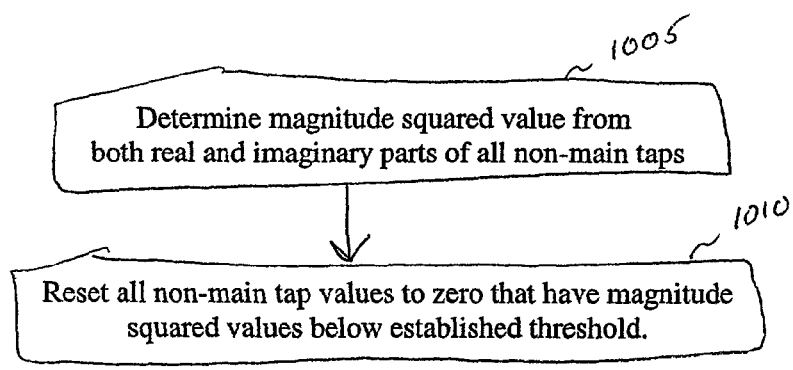
FIG. 10 is a flowchart of a method for performing coefficient clipping during ranging of a cable modem according to embodiments of the present invention.

Referring to FIG. 10, in an embodiment of the present invention, the magnitude squared value from both the real and imaginary parts of any non-main taps is determined (step 1005).

Next, in step 1010, for all non-main tap values of the real and imaginary parts of the new pre-equalizer coefficients whose magnitude squared value ($F_{i real}^2 + F_{i imaginary}^2$) is less than a determined threshold (for example, −36 dB, 0.00025 in linear representation) is reset to zero (0). In this way any noise resulting from the new pre-equalizer coefficients and the convolution process is reduced.

Figure 11:
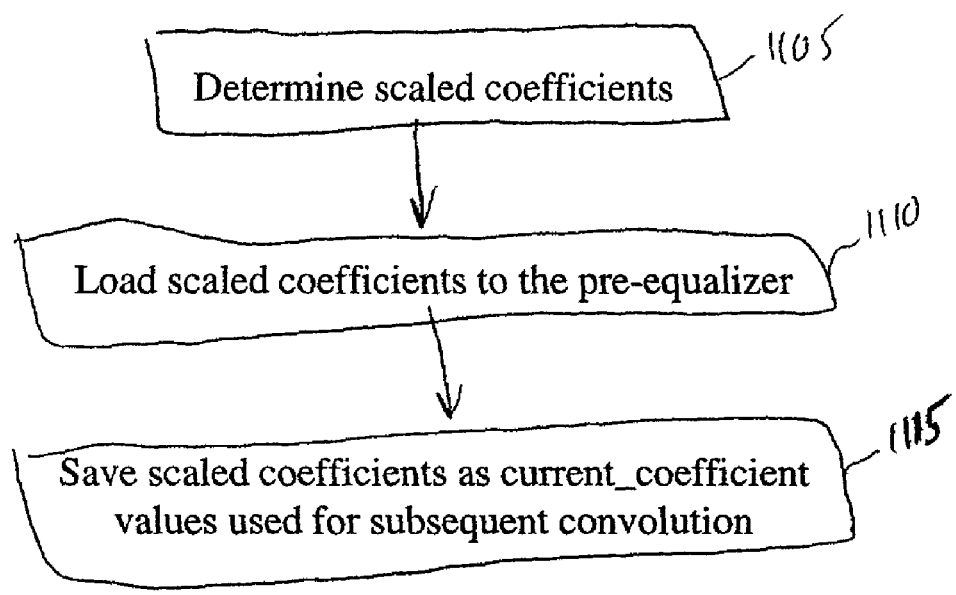
FIG. 11 is a flowchart a method for performing coefficient scaling during ranging of a cable modem according to embodiments of the present invention.

(d) Example Coefficient Scaling Method in Accordance with Embodiments of the Present Invention Referring again to FIG. 7, in a step 730, coefficient scaling is performed. Coefficient scaling is used to prevent overloading of the CM modulator. An exemplary routine for performing coefficient scaling according to an embodiment of the present invention will now be described with reference to FIG. 11.

In a step 1105, scaled coefficients are determined using the equation:

$$\overline{C}_i = (C_i) \bigg/ \sum_{i=1}^{N} (|C_i^{real}| + |C_i^{imag}|) \quad \text{(EQ2A)}$$

Where $C_i$ refers to either the real or imaginary part of the new equalizer coefficients. In this way the new pre-equalizer coefficients are normalized in an absolute-sum sense.

In an alternative embodiment, Root Mean Squared (RMS) or equivalently L(2)-norm scaling is used. Accordingly, scaled coefficients can also be determined using the equation:

$$\overline{C}_i = (C_i) \bigg/ \left( sqrt\left( \sum_{i=1}^{N} (C_i^{real})^2 + (C_i^{image})^2 \right) \right) \quad \text{(EQ2B)}$$

Once the scaled coefficients $\overline{C}_i$ have been determined, they are loaded into the pre-equalizer 325 of CM 106 (step 1110).

Next, in a step 1115, the current coefficient values are set equal to the scaled coefficients. The current coefficient values are then used for subsequent convolution iterations.

(e) Example Power Correction Method in Accordance with Embodiments of the Present Invention Following step 730, power correction is performed. (Step 735) The equalizer coefficients produce a change in the overall transmit power of the CM.

This change needs to be compensated for in the output power of the CM. The changes made to the output power to compensate for the equalizer coefficients are in addition to any power adjustments indicated in the power level adjust field of the received RNG-RSP message. An exemplary method for performing power correction is explained with reference to FIG. 12.

Figure 12:
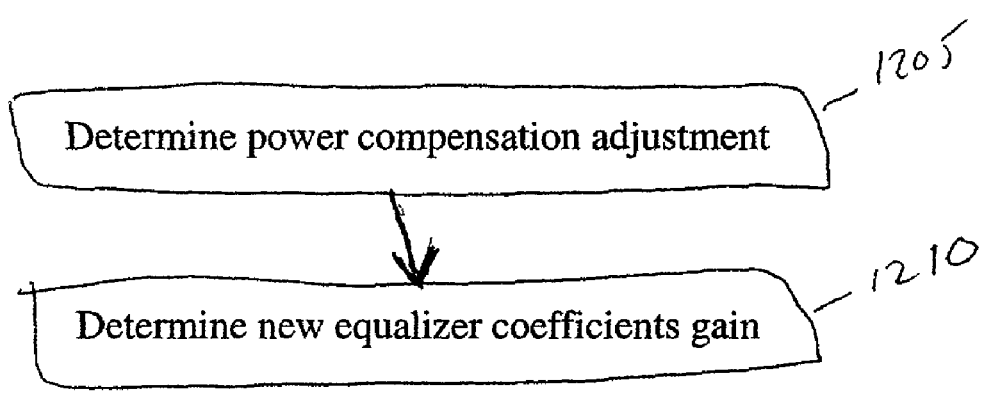
FIG. 12 is a flowchart of a method for performing power corrections during ranging of a cable modem according to embodiments of the present invention.

Referring to FIG. 12, in an embodiment of the present invention, in step 1205, output power change corresponding to an equalizer coefficient gain change value ($\Delta P$) is calculated in dB using the equation:

$$\Delta P(dB) = 10 \log 10 \, (P_{cur}/P_{new}) \quad \text{(EQ3)}$$

Where $P_{new}$ represents a new equalizer coefficient gain value and is derived from the equation:

$$P = \sum_{i=1}^{N} \left( (\overline{C}^{real}_i)^2 + (\overline{C}^{imag}_i)^2 \right) \quad \text{(EQ4)}$$

$P_{cur}$ is a current equalizer gain value and $\overline{C}_i$ refers to the final, scaled coefficients. In an embodiment, $P_{cur}$ is set to be one (1) during initial ranging or whenever the pre-equalizer is reset to a default setting. Otherwise, $P_{cur}$ refers to the equalizer coefficient gain value determined in a previous iteration. In step 1210, the new equalizer coefficient gain value is stored along with the new pre-equalizer coefficients. The absolute transmit power level may need to be calculated or tabulated during each ranging to make sure that its level does not exceed the maximum limit allowed in the specification (e.g. 58 dBmV for QPSK and 55 dBmV for 16 QAM. For the overall power calculation, the new equalizer coefficient gain value determined above should also be accounted for along with the power amp gain in the RF section. Accordingly, the overall transmission power (Overall_TX_power) is set as the result of new equalizer coefficient gain value+the power amp gain in dB.

In an embodiment of the present invention, the ranging process 400 should be performed in accordance with the order presented (i.e., time, power, carrier frequency, and pre-equalization). One of ordinary skill in the art will recognize that the operations can be performed in a different sequential order. For example, time and power can be corrected in parallel with carrier frequency and pre-equalization. However, the pre-equalizer coefficient routine should follow after the carrier frequency correction. Further, in an embodiment, the pre-equalization step should be performed for at least two iterations.

CONCLUSION

The previous description of the disclosed embodiments is provided to enable any person skilled in the art to make or use the present invention. While the invention has been particularly shown and described with reference to preferred embodiments thereof, it will be understood by those skilled in the art that various changes in form and detail may be made therein without departing from the spirit and scope of the invention.

What is claimed is:

1. A method for performing ranging operations in a cable modem system that includes two or more cable modems, comprising the steps of:

(a) receiving at a cable modem, a ranging response generated by a cable modem termination system, the ranging response comprised of a plurality of ranging parameters including an upstream communications parameter, a timing adjust parameter, a power level adjust parameter, a carrier frequency offset parameter, and a plurality of equalization parameters, the equalization parameters including a number of ranging response equalizer coefficients, wherein the ranging response is the first ranging response received since the cable modem was initialized;

(b) setting a current pre-equalizer coefficient for each one of a plurality taps at the cable modem equal to the ranging response equalizer coefficients to generate new pre-equalizer coefficients, wherein one of said plurality of taps is designated a main tap and the remaining number of said plurality of taps are referred to as non-main taps and further wherein each one of said plurality of taps has a real part and an imaginary part;

(c) derotating the new pre-equalizer coefficients so that the imaginary part of the main tap is equal to zero;

(d) identifying each non-main tap having a determined magnitude squared value below a specified threshold and setting the new pre-equalizer coefficients for the real part and the imaginary part of each identified non-main tap to zero;

(e) generating scaled coefficients using the new pre-equalizer coefficients for the main tap and non-main taps obtained from steps (c) and (d); and (f) adjusting a transmit power of the cable modem using an equalizer coefficient gain change value, the equalizer coefficient gain change value being determined from a current equalizer coefficient gain value and a new equalizer coefficient gain value in accordance with $\Delta P(dB) = 10 \log 10 \, (P_{cur}/P_{new})$, wherein the new equalizer coefficient gain value is determined from $$P = \sum_{i=1}^{N} ((\overline{C}^{real} i)^2 + (\overline{C}^{imag} i)^2)$$

wherein $P_{new}$ represents a new equalizer coefficient gain value, $P_{cur}$ is a current equalizer gain value, N refers to a number of feedforward taps, and $\overline{C}_i$ refers to the generated scaled coefficients.

2. The method of claim 1, wherein said cable modem termination system determines said timing adjust parameter and thereafter determines said power level adjust parameter and further wherein said carrier frequency offset parameter is determined after determining said power level adjust parameter and before determining said plurality of equalization parameters.

3. The method of claim 1, wherein said generating scaled coefficients step (e) generates the scaled coefficients in accordance with $$\overline{C}_i = (C_i) / \sum_{i=1}^{N} (|C_i^{real}| + |C_i^{imag}|),$$

where $C_1$ refers to the new pre-equalizer coefficients for the real and imaginary parts of both the main tap and the non-main taps from steps (c) and (d).

4. The method of claim 1, wherein said generating scaled coefficients step (e) generates the scaled coefficients in accordance with $$\overline{C}_i = (C_i) / \left( sqrt\left( \sum_{i=1}^{N} (C_i^{real})^2 + (C_i^{imag})^2 \right) \right),$$

where Ci refers to the new pre-equalizer coefficients for the real and imaginary parts of both the main tap and the non-main taps from steps (c) and (d).

5. The method of claim 1, wherein said receiving a ranging response step (a) comprises receiving a number of ranging response equalizer coefficients wherein the ranging response equalizer coefficients associated with the imaginary parts of the main tap and the non-main taps are negated from a coefficient equalizer set in said cable modem termination system.

6. The method of claim 1, further comprising the steps of
   adjusting a transmission time parameter of the cable modem by an amount equal to the timing adjust parameter received in the ranging response prior to performing steps (b), (c), (d), (e), and (f);
   adjusting a power transmission level parameter of the cable modem by an amount equal to the power level adjust parameter received in the ranging response after setting the transmission time parameter and prior to performing steps (b), (c), (d), (e), and (f); and
   adjusting an upstream carrier frequency parameter of the cable modem by an amount equal to the carrier frequency offset parameter received in the ranging response after setting the power transmission level parameter and prior to performing steps (b), (c), (d), (e), and (f).

7. The method of claim 6, further comprising the step of averaging the carrier frequency offset parameter over multiple ranging iterations.

8. The method of claim 1, wherein said cable modem termination system determines said timing adjust parameter, said power level adjust parameter, and said carrier frequency offset parameter before determining said plurality of equalization parameters.

9. The method of claim 1, wherein said cable modem termination system determines said carrier frequency offset parameter before determining said plurality of equalization parameters.

10. A method for performing ranging operations in a cable modem system that includes two or more cable modems, comprising the steps of:

(a) receiving at a cable modem, a subsequent ranging response generated by a cable modem termination system after generating a first ranging response, the subsequent ranging response comprised of a plurality of ranging parameters including an upstream communications parameter, a timing adjust parameter, a power level adjust parameter, a carrier frequency offset parameter, and a plurality of equalization parameters, the equalization parameters including a main tap location and a number of ranging response equalizer coefficients;

(b) using the ranging response equalizer coefficients to convolve a number of current pre-equalizer coefficients for a main tap and one or more non-main taps located in the cable modem according to $$C'_j = \sum_{i=1}^{N} F_i C_{j-i+K}$$

to generate new pre-equalizer coefficients and derotating the new pre-equalizer coefficients so that an imaginary part of the main tap is equal to zero, where i refers to a summation index, K refers to the main tap location, N refers to a number of feedforward taps, $C'_j$ refers to the new pre-equalizer coefficients, $C_{j-i+K}$ refers to the current pre-equalizer coefficients, and $F_i$ refers to the ranging response equalizer coefficients;

(c) identifying each non-main tap having a determined magnitude squared value below a specified threshold and setting the new pre-equalizer coefficient for a real part and an imaginary part of the identified non-main taps equal to zero;

(d) generating scaled coefficients using the new pre-equalizer coefficients for the main tap and non-main taps from steps (b) and (c); and (e) adjusting a transmit power of the cable modem using a equalizer coefficient gain change value, the equalizer coefficient gain change value being determined from a current equalizer coefficient gain value and a new equalizer coefficient gain value in accordance with $\Delta P(dB) = 10 \log 10 (P_{cur}/P_{new})$, wherein the new equalizer coefficient gain value is determined from $$P = \sum_{i=1}^{N} \left( \left(\overline{C}^{real}{}_i\right)^2 + \left(\overline{C}^{imag}{}_i\right)^2 \right)$$

wherein $P_{new}$ represents a new equalizer coefficient gain value, $P_{cur}$ is a current equalizer gain value and $\overline{C}_i$ refers to the generated scaled coefficients.

11. The method of claim 10, wherein the current equalizer coefficient gain value used in adjusting step (e) is equal to the new equalizer coefficient gain value.

12. The method of claim 10, wherein said cable modem termination system determines said timing adjust parameter and thereafter determines said power level adjust parameter and further wherein said carrier frequency offset parameter is determined after determining said power level adjust parameter and before determining said plurality of equalization parameters.

13. The method of claim 10, wherein said generating scaled coefficients step (d) generates the scaled coefficients in accordance with $$\overline{C}_i = (C_i) / \sum_{i=1}^{N} (|C_i^{real}| + |C_i^{imag}|),$$

where $C_i$ refers to the new pre-equalizer coefficients for the real and imaginary parts of both the main tap and the non-main taps from steps (b) and (c).

14. The method of claim 10, wherein said generating scaled coefficients step (d) generates the scaled coefficients in accordance with $$\overline{C}_i = (C_i) / \left( sqrt\left( \sum_{i=1}^{N} (C_i^{real})^2 + (C_i^{imag})^2 \right) \right),$$

where Ci refers to the new pre-equalizer coefficients for the real and imaginary parts of both the main tap and the non-main taps from steps (b) and (c).

15. The method of claim 10, wherein said receiving a subsequent ranging response step (a) comprises receiving a number of ranging response equalizer coefficients, wherein the ranging response equalizer coefficients associated with the imaginary parts of the main tap and the non-main taps are negated from a coefficient set in the cable modem termination system.

16. The method of claim 10, further comprising the steps of
adjusting a transmission time parameter of the cable modem by an amount equal to the timing adjust parameter received in the ranging response prior to performing steps (b), (c), (d), and (e);
adjusting a power transmission level parameter of the cable modem by an amount equal to the power level adjust parameter received in the ranging response after setting the transmission time parameter and prior to performing steps (b), (c), (d), and (e); and
adjusting an upstream carrier frequency parameter of the cable modem by an amount equal to the carrier frequency offset parameter received in the ranging response after setting the power transmission level parameter and prior to performing steps (b), (c), (d), and (e).

17. The method of claim 10, further comprising the step of averaging the frequency offset parameter over multiple ranging iterations.

18. The method of claim 10, wherein said cable modem termination system determines said timing adjust parameter, said power level adjust parameter, and said carrier frequency offset parameter before determining said plurality of equalization parameters.

19. The method of claim 10, wherein said cable modem termination system determines said carrier frequency offset parameter before determining said plurality of equalization parameters.

20. A system for performing ranging operations in a cable modem system including two or more cable modems, comprising:

(a) means for receiving a subsequent ranging response at a cable modem, the subsequent ranging response comprised of a plurality of ranging parameters including an upstream communications parameter, a timing adjust parameter, a power level adjust parameter, a carrier frequency offset parameter, and a plurality of equalization parameters, the equalization parameters including a main tap location, and a number of ranging response equalizer coefficients;

(b) means for convolving a number of current equalizer coefficients for a main tap and a number of non-main taps located at the cable modem according to $$C'_j = \sum_{i=1}^{N} F_i C_{j-i+K}$$

using the ranging response equalizer coefficients to generate new equalizer coefficients and means for derotating the new equalizer coefficients so that an imaginary part of the main tap is equal to zero, where i refers to a summation index, K refers to the main tap location, N refers to a number of feedforward taps, $C'_j$ refers to the new pre-equalizer coefficients, $C_{j-i+k}$ refers to the current pre-equalizer coefficients, and $F_i$ refers to the ranging response equalizer coefficients;

(c) means for identifying each non-main tap having a determined magnitude squared value below a specified threshold and setting the new pre-equalizer coefficient for a real part and an imaginary part of the identified non-main taps equal to zero;

(d) means for generating scaled coefficients; and (e) means for adjusting a transmit power of the cable modem using an equalizer coefficient gain change value, the equalizer coefficient gain change value being determined from a current equalizer coefficient gain value and a new equalizer coefficient gain value in accordance with $$\Delta P(\text{dB}) = 10 \log 10 \, (P_{cur}/P_{new}),$$

wherein the new equalizer coefficient gain value is determined from $$P = \sum_{i=1}^{N} \left( \left(\overline{C}^{real}_i\right)^2 + \left(\overline{C}^{imag}_i\right)^2 \right)$$

wherein $P_{new}$ represents a new equalizer coefficient gain value, $P_{cur}$ is a current equalizer gain value and $\overline{C}_i$ refers to the generated scaled coefficients.

21. A system for performing ranging operations in a cable modem system, comprising:

(a) a cable modem termination system configured to generate a ranging response, the ranging response comprised of a plurality of ranging parameters including an upstream communications parameter, a timing adjust parameter, a power level adjust parameter, a carrier frequency offset parameter, and a plurality of equalization parameters, the equalization parameters including a main tap location, and a number of ranging response equalizer coefficients;

(b) one or more cable modems configured to convolve a number of current pre-equalizer coefficients for a main tap and a number of non-main taps associated with each cable modem according to $$C'_j = \sum_{i=1}^{N} F_i C_{j-i+K}$$

using the ranging response equalizer coefficients to generate new pre-equalizer coefficients and to derotate the new pre-equalizer coefficients so that an imaginary part of the main tap is equal to zero, where i refers to a summation index, K refers to the main tap location, N refers to a number of feedforward taps, $C'_j$ refers to the new pre-equalizer coefficients, $C_{j-i+K}$ refers to the current pre-equalizer coefficients, and $F_i$ refers to the ranging response equalizer coefficients wherein the one or more cable modems are further configured to identify each non-main tap having a determined magnitude squared value below a specified threshold and set the new pre-equalizer coefficient for a real part and an imaginary part of the identified non-main taps equal to zero, and wherein the one or more cable modem are further configured to adjust a transmit power of the cable modem using an equalizer coefficient gain change value, the equalizer coefficient gain change value being determined from a current equalizer coefficient gain value and a new equalizer coefficient gain value in accordance with $$\Delta P(\text{dB}) = 10 \log 10 \, (P_{cur}/P_{new}),$$

wherein the new equalizer coefficient gain value is determined from $$P = \Sigma_{i=1}^{N}((\overline{C}^{real}_i)^2 + (\overline{C}^{imag}_i)^2)$$

wherein $P_{new}$ represents a new equalizer coefficient gain value, $P_{cur}$ is a current equalizer gain value and $\overline{C}_i$ refers to the generated scaled coefficients.

22. The system of claim 21, wherein the one or more cable modems are further configured to generate scaled coefficients using $$\overline{C}_i = (C_i) / \sum_{i=1}^{N} (|C^{real}_i| + |C^{imag}_i|),$$

where $C_i$ refers to the new pre-equalizer coefficients for the real and imaginary parts of the main tap and non-main taps.

23. The system of claim 21, wherein the one or more cable modems are further configured to generate scaled coefficients using $$\overline{C}_i = (C_i) / \left( sqrt\left( \sum_{i=1}^{N} (C^{real}_i)^2 + (C^{imag}_i)^2 \right) \right),$$

where $C_i$ refers to the new pre-equalizer coefficients for the real and imaginary parts of the main tap and non-main taps.

* * * * *

UNITED STATES PATENT AND TRADEMARK OFFICE
CERTIFICATE OF CORRECTION

PATENT NO. : 7,573,935 B2
APPLICATION NO. : 10/164367
DATED : August 11, 2009
INVENTOR(S) : Min et al.

It is certified that error appears in the above-identified patent and that said Letters Patent is hereby corrected as shown below:

Column 1
Line 12, "patent application" should be replaced with --Patent Application--.

Column 1
Line 14, "patent application" should be replaced with --Patent Application--.

Column 11
Lines 57-58, please replace

" $\overline{C}_i = (C_i) / \sum_{i=1}^{N} \left( \left| C_i^{real} \right| + \left| C_i^{imag} \right| \right)$ "

with

-- $\overline{C}_i = (C_i) / \sum_{i=1}^{N} \left( \left| C^{real}{}_i \right| + \left| C^{imag}{}_i \right| \right)$ --.

Column 12
Lines 2-4, please replace

" $\overline{C}_i = (C_i) / \left( sqrt \left( \sum_{i=1}^{N} \left( C_i^{real} \right)^2 + \left( C_i^{image} \right)^2 \right) \right)$ "

with

-- $\overline{C}_i = (C_i) / \left( sqrt \left( \sum_{i=1}^{N} \left( C^{real}{}_i \right)^2 + \left( C^{image}{}_i \right)^2 \right) \right)$ --.

Column 14
Lines 9-11, please replace

" $\overline{C}_i = (C_i) / \sum_{i=1}^{N} \left( \left| C_i^{real} \right| + \left| C_i^{imag} \right| \right)$ "

with

-- $\overline{C}_i = (C_i) / \sum_{i=1}^{N} \left( \left| C^{real}{}_i \right| + \left| C^{imag}{}_i \right| \right)$ --.

UNITED STATES PATENT AND TRADEMARK OFFICE
CERTIFICATE OF CORRECTION

PATENT NO. : 7,573,935 B2
APPLICATION NO. : 10/164367
DATED : August 11, 2009
INVENTOR(S) : Min et al.

It is certified that error appears in the above-identified patent and that said Letters Patent is hereby corrected as shown below:

Column 14
Lines 21-23, please replace

" $\overline{C}_i = (C_i) / \left( sqrt\left( \sum_{i=1}^{N} \left(C_i^{real}\right)^2 + \left(C_i^{image}\right)^2 \right)\right)$ "

with

-- $\overline{C}_i = (C_i) / \left( sqrt\left( \sum_{i=1}^{N} \left(C^{real}_i\right)^2 + \left(C^{image}_i\right)^2 \right)\right)$ --.

Column 16
Lines 3-4, please replace

" $\overline{C}_i = (C_i) / \sum_{i=1}^{N} \left( \left|C_i^{real}\right| + \left|C_i^{imag}\right| \right)$ "

with

-- $\overline{C}_i = (C_i) / \sum_{i=1}^{N} \left( \left|C^{real}_i\right| + \left|C^{imag}_i\right| \right)$ --.

Column 18
Line 14, a comma should appear after the word "coefficients".

Column 18
Lines 41-43, please replace

" $\overline{C}_i = (C_i) / \sum_{i=1}^{N} \left( \left|C_i^{real}\right| + \left|C_i^{imag}\right| \right)$ "

with

-- $\overline{C}_i = (C_i) / \sum_{i=1}^{N} \left( \left|C^{real}_i\right| + \left|C^{imag}_i\right| \right)$ --.

UNITED STATES PATENT AND TRADEMARK OFFICE
CERTIFICATE OF CORRECTION

PATENT NO. : 7,573,935 B2
APPLICATION NO. : 10/164367
DATED : August 11, 2009
INVENTOR(S) : Min et al.

Page 3 of 3

It is certified that error appears in the above-identified patent and that said Letters Patent is hereby corrected as shown below:

Column 18
Lines 53-54, please replace

" $\overline{C}_i = (C_i)/\left( sqrt\left( \sum_{i=1}^{N} (C_i^{real})^2 + (C_i^{image})^2 \right) \right)$ "

with

-- $\overline{C}_i = (C_i)/\left( sqrt\left( \sum_{i=1}^{N} (C^{real}_i)^2 + (C^{image}_i)^2 \right) \right)$ --.

Signed and Sealed this

Twenty-second Day of December, 2009

David J. Kappos
*Director of the United States Patent and Trademark Office*